United States Patent
Jain et al.

(10) Patent No.: US 11,064,000 B2
(45) Date of Patent: Jul. 13, 2021

(54) ACCESSIBLE AUDIO SWITCHING FOR CLIENT DEVICES IN AN ONLINE CONFERENCE

(71) Applicant: Adobe Inc., San Jose, CA (US)

(72) Inventors: Ajay Jain, Ghaziabad (IN); Sachin Soni, New Delhi (IN); Amit Srivastava, Noida (IN)

(73) Assignee: Adobe Inc., San Jose, CA (US)

( * ) Notice: Subject to any disclaimer, the term of this patent is extended or adjusted under 35 U.S.C. 154(b) by 246 days.

(21) Appl. No.: 15/826,447

(22) Filed: Nov. 29, 2017

(65) Prior Publication Data
US 2019/0166176 A1 May 30, 2019

(51) Int. Cl.
| | |
|---|---|
| *G06F 15/16* | (2006.01) |
| *G06F 3/01* | (2006.01) |
| *H04L 29/06* | (2006.01) |
| *G10L 13/00* | (2006.01) |

(52) U.S. Cl.
CPC .......... *H04L 65/604* (2013.01); *H04L 65/403* (2013.01); *G10L 13/00* (2013.01)

(58) Field of Classification Search
CPC .................................. G06F 15/16; G06F 3/01
USPC .................................. 709/204, 753; 715/753
See application file for complete search history.

(56) References Cited

U.S. PATENT DOCUMENTS

| | | | |
|---|---|---|---|
| 2003/0028380 A1* | 2/2003 | Freeland | G10L 13/00 704/260 |
| 2010/0283829 A1 | 11/2010 | De Beer et al. | |
| 2012/0069131 A1* | 3/2012 | Abelow | G06Q 10/067 348/14.01 |
| 2015/0100635 A1* | 4/2015 | Huang | H04L 65/403 709/204 |
| 2015/0120278 A1 | 4/2015 | Waibel | |
| 2017/0076713 A1 | 3/2017 | Gildein et al. | |
| 2018/0337963 A1* | 11/2018 | Faulkner | H04L 65/1046 709/219 |

OTHER PUBLICATIONS

"Combined Search and Examination Report", GB Application No. 1816080.4, dated Mar. 27, 2019, 6 pages.

* cited by examiner

*Primary Examiner* — Sibte H Bukhari
(74) *Attorney, Agent, or Firm* — FIG. 1 Patents

(57) ABSTRACT

Techniques and systems are described for accessible audio switching options during the online conference. For example, a conferencing system receives presentation content and audio content as part of the online conference from a client device. The conferencing system generates voice-over content from the presentation content by converting text of the presentation content to audio. The conferencing system then divides the presentation content into presentation segments. The conferencing system also divides the audio content into audio segments that correspond to respective presentation segments, and the voice-over content into voice-over segments that correspond to respective presentation segments. As the online conference is output, the conferencing system enables switching between a corresponding audio segment and voice-over segment during output of a respective presentation segment.

20 Claims, 7 Drawing Sheets

ACCESSIBLE AUDIO SWITCHING FOR CLIENT DEVICES IN AN ONLINE CONFERENCE

BACKGROUND

Online conferences including web conferencing, online meetings, webinars, and so forth are implemented to provide an immersive and interactive experience to participants via corresponding client devices via a network. Online conferences allow people across the world to collaborate using a variety of different types of media content (i.e., audio, digital images, video, software demonstrations, and so forth). Oftentimes, however, participants in online conferences have a disability that makes consumption of different media content items difficult, especially at real-time speeds. For example, current online conference systems do not provide adequate accessibility options for viewers who have a visual impairment and cannot see content of the online conference, such as a presenter of the online conference or other visual components of the online conference. Consequently, participants of online conferences with disabilities miss out on consuming important online conference content.

SUMMARY

Techniques and systems are described to enable participants of an online conference to access audio switching options during the online conference. For example, a conferencing system receives presentation content, such as a slideshow, a video, a screen share, a software demonstration, and so forth as part of the online conference from a client device. The conferencing system also receives audio content such as a live or pre-recorded audio stream of the presenter of the online conference from the client device. The conferencing system generates voice-over content from the presentation content by converting text of the presentation content to audio, or in some examples, to Braille. The voice-over content may be generated using screen reading techniques and systems, such as Job Access With Speech (JAWS) and/or NonVisual Desktop Access (NVDA).

The conferencing system then divides the presentation content into presentation segments. The presentation segments may correspond to segments ranging from individual words or phrases to slides of a presentation, or segments larger than slides of the presentation, to name a few examples. The conferencing system also divides the audio content into audio segments that correspond to respective presentation segments, and the voice-over content into voice-over segments that correspond to respective presentation segments. By doing so, the conferencing system associates a presenter's audio with corresponding voice-over audio that describes the visual content of the online conference. As the online conference is output, the conferencing system enables switching between a corresponding audio segment and voice-over segment during output of a respective presentation segment. In this way, users can switch between a presenter's audio and voice-over audio that describes the visual content of the online conference, and cross-reference content form the voice-over audio whenever desired while listening to the presenter's audio.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
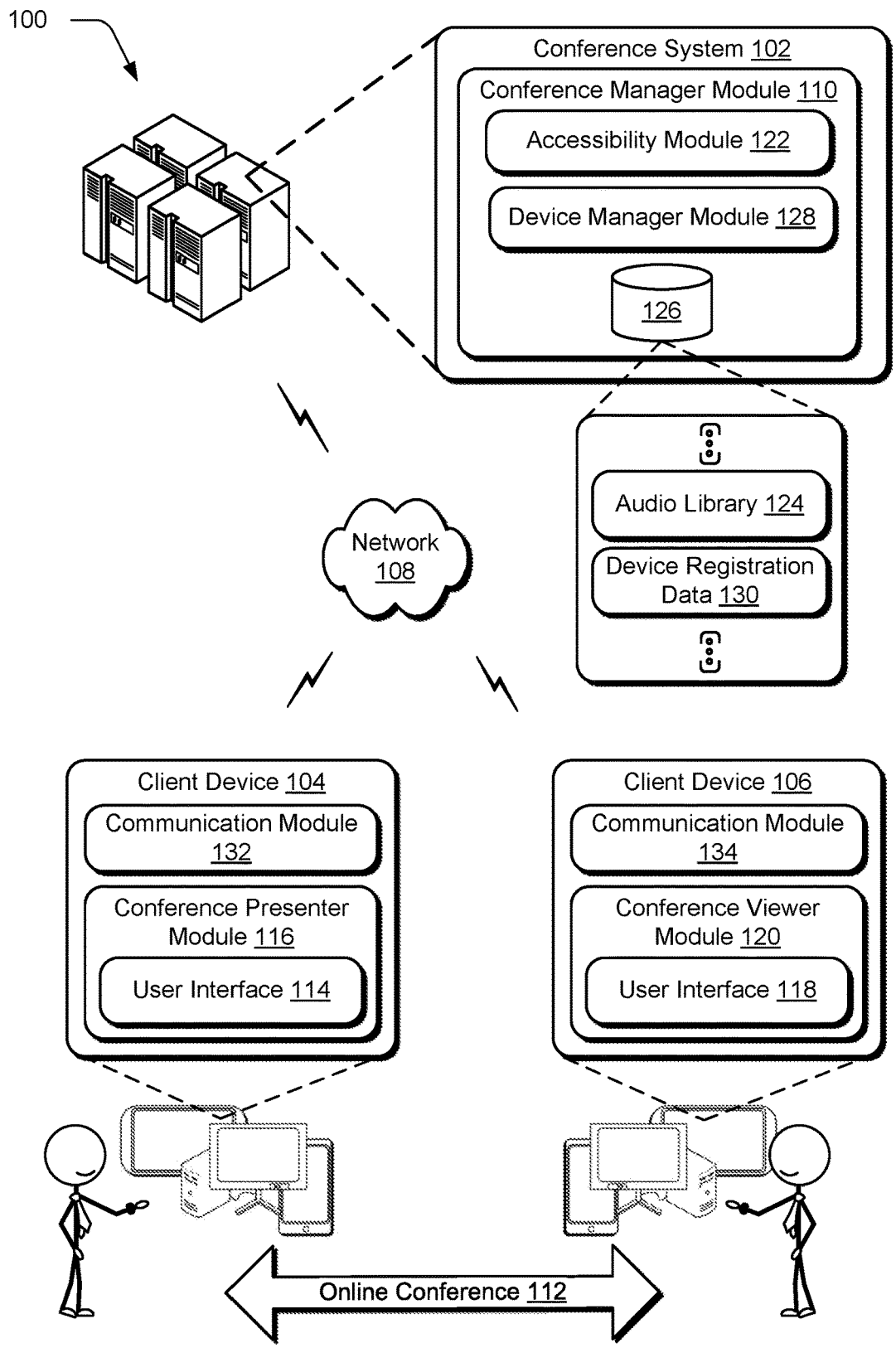
FIG. 1 is an illustration of an environment in an example implementation that is operable to employ techniques for accessible audio switching in an online conference as +-described herein.

Online conferences are becoming increasingly popular to disseminate information between remote participants. One of the benefits of online conferences is that many different types of information can be shared between remote participants, even simultaneously. For example, an online conference may present a slideshow, a live video feed of a presenter, live audio of the presenter, a chat box between the online conference participants, and profile pictures of the conference participants all in a single user interface. However, conventional conference systems often do not provide accessibility options for people with disabilities. For instance, conventional conference systems do not provide a person with a visual impairment with acceptable ways to consume the content of an online conference.

Particularly, participants of an conventional online conferences who are blind or have another visual impairment only have access to a presenter's audio as the conference is displayed. A significant amount of content in online conferences is presented using visual techniques, such as slides, videos, software demonstrations, and so forth while the presenter of an online conference is presenting. Some conventional techniques exist which convert visual content such as text on presentation slides to audio. However, the conventional techniques that convert visual content to audio either perform the conversion while the visual content is displayed on the screen, or after the presentation is completed.

In cases where the conversion takes place while the visual content is displayed on the screen, the conventional techniques do not account for any other audio being output, including audio content of the online conference presenter. This can be very confusing for participants of the online conference, especially when two audio streams are being output simultaneously. In cases where the conversion takes place when the presentation is completed, participants of the online conference must take time to consume the presentation again at a later time. Additionally, participants of the online conference must manually navigate between two or more different streams of audio content to gain a full picture of the content of a presentation. This manual navigation can be painstaking and frustrating for users, including visually impaired users.

Accordingly, techniques and systems are described in which a conference system is configured to associate segments of presentation content with respective segments of audio content and voice-over content to provide accessibility of the online conference to online conference participants. The conference system, for instance, may be configured to support an interactive experience between client devices in a variety of different ways. Examples of which include use as part of an online application (via a subscription-based service system), provide opportunities to purchase a good or service, online storage, or other web service that is accessible via a network. The conference may include a variety of different content that may be communicated and stored digitally or electronically, e.g., movies, books, documents, games, applications, images, audio files, and so on.

To begin, the conference system receives presentation content and audio content as part of the online conference from a client device. In one example, the presentation content is one or more streams of visual content, such as a video of a presenter of the online conference, video related to subject matter of the online conference, a slideshow, a software demonstration, a screen share, and so forth. The audio content is one or more streams of audio such as a presenter's voice, audio associated with a video related to subject matter of the online conference, audio associated with a slideshow or software demonstration, and so forth. The online conference provides an interactive experience between multiple client devices to share the presentation content and the audio content, which may occur in real time. Alternatively or additionally, the online conference is provided for subsequent consumption by users after the online conference has concluded (e.g., as a Webinar).

In addition to the presentation content and audio content described above, the online conference can support different types of user interaction to provide an immersive experience for participants, such as a note portion (e.g., notes to be shared by a presenter), a share portion (e.g., documents, spread sheets, or other digital content shared with other attendees), a chat portion (e.g., to communicate with all or one particular attendee within the online conference), a poll portion (e.g., to poll attendees of the conference), a notepad portion (e.g., to retain notes personal to particular attendees of the online conference), or an attendee portion to list "who" is attending the online conference.

After receiving the presentation content and the audio content, the conference system generates voice-over content from the presentation content. For example, the conference system can translate textual words in the presentation content to a stream of audio, and generates the voice-over content using the translation. The conference system may utilize speech synthesis and/or screen reading techniques and systems to convert text of the presentation content to audio, or in some examples, to Braille. For instance, the conference system may utilize screen reading systems such as Job Access With Speech (JAWS) and/or NonVisual Desktop Access (NVDA) to generate voice-over content from presentation content of the online conference.

The conference system then divides the presentation content into presentation segments which may range from individual words or phrases to slides of a presentation, or segments larger than slides of the presentation, to name a few examples. In doing so, the conference system may include time stamps where the presentation content is divided into segments. The conference system also divides the audio content into audio segments that correspond to respective presentation segments, and the voice-over content into voice-over segments that correspond to respective presentation segments.

In many cases, the audio segments and the voice-over segments that correspond to the same presentation segment will have different durations. In conventional systems, a screen reading technique is typically implemented independently of the presentation content and audio content of the online conference. Therefore, neither the conventional screen reading system nor the conventional online conference take into account the duration of the other's content. This may lead to a screen reading of visual content being cut off when presentation content changes without the screen reading being complete, or a presenter's audio being output at the same time as the screen reading, which is confusing and frustrating for participants of the online conference.

On the other hand, the conference system described herein controls the online conference to enable switching between a corresponding audio segment and voice-over segment during output of a respective presentation segment. Because an audio segment and a voice-over segment are associated with a respective presentation segment, content that is related to the same presentation segment is tied together. This allows conference participants to switch between audio associated with the same presentation segment seamlessly, without having to manually search through two or more different audio streams for related content.

For example, say a conference participant begins by listening to the presenter's audio in an audio segment, and midway through the audio segment wishes to reference a point made by the presenter in the presentation content. The conference participant can provide an indication to switch (e.g., via an input in a user interface of the online conference), and the corresponding voice-over segment which describes the presentation content begins, while the audio content of the presenter is paused. The conference system may save a location, or time stamp, of the audio content where the conference participant switched from the audio segment to the voice-over segment. If the conference participant provides a user input to switch back to the audio segment from the voice-over segment, the audio segment may resume from its paused location. In another example, if the conference participant concludes the voice-over segment and continues onto a next presentation segment, the conference system may cause an audio segment corresponding to the next presentation segment to be output in response to an indication to switch.

The techniques described herein may provide additional functionality for switching between corresponding audio and voice-over segments in an online conference as well. For instance, in a live online conference, pausing the audio of the presenter to listen to voice-over content may result in the live presentation continuing without a conference participant. The conference system provides another option to conference participants to rejoin the live presentation after switching from the audio content to the voice-over content, in addition to switching back to a paused location of the audio content. In another example, the conference system may provide an option of automatic switching between audio segments and voice-over segments associated with a presentation segment. In this example, the conference system may first output the presenter's audio segment, and then automatically output the voice-over segment corresponding to the same presentation segment. At the next presentation segment, the conference system may begin again with the audio segment corresponding to the next presentation segment, and then automatically output the voice-over segment corresponding to the next presentation segment, continuing on through the online conference.

The described techniques for providing accessible audio switching in an online conference help participants with physical disabilities consume online conference content in an easy and immersive way. Furthermore, the described techniques provide online conferences that comply with Section 508 guidelines, the Americans with Disabilities Act (ADA), and other regional and country-specific regulations with advantages in both live and pre-recorded online conferences without additional costs imposed on conference presenters. Accordingly, both consumption of online conferences for persons with physical disabilities, along with the production of online conferences for a wide range of participants, is greatly simplified with a seamless, accessible experience for all participants.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ online conference techniques described herein. The illustrated environment 100 includes a conference system 102 and client devices 104, 106, that are communicatively coupled, one to another, via a network 108. Computing devices that implement the conference system 102 and client devices 104, 106 may be configured in a variety of ways.

A computing device, for instance, may be configured as a desktop computer, a laptop computer, a mobile device (e.g., assuming a handheld configuration such as a tablet or mobile phone as illustrated), and so forth. Thus, a computing device may range from full resource devices with substantial memory and processor resources (e.g., personal computers, game consoles) to a low-resource device with limited memory and/or processing resources (e.g., mobile devices). Additionally, a single computing device may be representative of several different devices, such as multiple servers utilized by a business to perform operations "over the cloud" as described in FIG. 7.

The conference system 102 includes a conference manager module 110. The conference manager module 110 is implemented at least partially in hardware of a computing device (e.g., processing system and computer-readable storage media) to manage an online conference 112 between the client devices 104, 106. The online conference 112, for example, may be configured as a web conference, online meeting, webinar, and so forth. The client devices 104 and 106 each include a communication module 132, 134, to communicate with other client devices and with the conference system 102 during the online conference 112, such as to send audio and presentation content, receive audio and presentation content, receive voice-over content, communicate via a chat box, and so forth.

A user interacting with client device 104, for instance, may provide a user input through interaction with a user interface 114 of a conference presenter module 116 (e.g., mobile application, third-party browser plug-in, etc.) to initiate the online conference 112. This may include specifying a time at which the online conference 112 is to begin and end, attendees that are permitted to join the online conference 112 (e.g., a user of client device 106), a title and subject matter of the online conference, and so forth.

The conference manager module 110, upon receipt of data corresponding to the user input, is configured to initiate the online conference 112 as instructed. A user of client device 106, for instance, may interact with a user interface 118 output by a conference viewer module 120 to join the online conference 112. This may include selection of a secure (e.g., obscured) link, provision of user credentials, download of the conference viewer module 120 for execution within a browser, and so forth. The conference system 102 may then manage the online conference 112, such as to serve as an intermediary for communications between the client devices 104, 106. In another example, functionality of the conference system 102 is implemented in whole or in part through use of the conference presenter module 116 and the conference viewer module 120, such as to support a peer-to-peer network, direct communication between the client devices 104, 106 via the network 108, and so forth.

The online conference 112, as previously described, is typically configured to provide an immersive and interactive experience. To do so, the user interfaces 114, 118 output by the conference presenter module 116 and the conference viewer module 120, respectively, include options corresponding to the online conference. For example, the conference presenter module 116 and the conference viewer module 120 include options for users of the respective client devices 104, 106 to select audio to be output by the client devices of the online conference, such as a voice to output text input by users of the respective client devices. Upon selection of a voice by a user of the client device 104, the voice will be output at the other client devices participating in the online conference 112 in association with actions taken by the user of the client device 104. Similarly, upon selection of a voice by a user of the client device 106, the voice will be output at the other client devices participating in the online conference 112 in association with actions taken by the user of the client device 106.

Additionally, the conference viewer module 120 includes options in the user interface 118 to request accommodations for the online conference 112, such as voice-over content corresponding to presentation content of the online conference. A user interacting with client device 106, for instance, may provide a user input through interaction with the user interface 118 of the conference viewer module 120 to request voice-over content corresponding to presentation content of the online conference 112. Alternatively or additionally, the conference viewer module 120 includes options such as voice input or hardware input (e.g., via a button on the client device 106) with which a user interacting with the client device may request voice-over content corresponding to presentation content of the online conference 112.

The conference manager module 110 is illustrated as including an accessibility module 122 implemented at least partially in hardware of a computing device to provide accessible audio switching to client devices in the online conference 112. Upon receipt of data corresponding to the user input, the accessibility module 122 generates voice-over content and enables switching between the voice-over content and audio content of the online conference as described above and below. The accessibility module 122 accesses an audio library 124 maintained in storage 126 (e.g., a database or other type of storage device or computer-readable storage medium as described further in relation to FIG. 7) of the conference system 102 to translate presentation content of the online conference 112 to audio in the form of voice-over content. The audio library 124 includes textual words and phrases along with audio from a spoken language to generate voice-over content synchronized with presentation content of the online conference 112. The conference manager module 110 may utilize screen reading techniques and systems, such as Job Access With Speech (JAWS) and/or NonVisual Desktop Access (NVDA), together with the audio library 124 to generate voice-over content from presentation content of the online conference 112.

In one example, the accessibility module 122 causes textual content input by a presenter at the client device 104 to use the audio library 124 to translate the textual content in real time. The accessibility module 122 then provides voice-over content corresponding to the textual content in a voice of the presenter, or a voice selected by the presenter, to a viewer at the client device 106 who requested the voice-over content. in this way, the viewer at the client device 106 receives voice-over content in real time, thus enabling real-time switching between live audio of the presenter and voice-over content of the current visual aspects of the presentation.

The conference manager module 110 is also illustrated as including a device manager module 128. The device manager module 128 is implemented at least partially in hardware of a computing device to provide appropriate options and content to participants of the online conference. For instance, the device manager module 128 determines which devices participating in the online conference will receive presentation content and audio content, and which devices participating in the online conference will receive presentation content, audio content, and voice-over content.

A user of the client device 106, for instance, may interact with a user interface 118 to pre-register client devices as associated with a user account of the user with the conference system 102. Device registration data 130 is then maintained in the storage 126 by the conference system 102 that is associated with this registration. The device registration data 130, for instance, may include data usable by the device manger module 128 to automatically provide voice-over content with presentation and audio content during the online conference 112. In one example, the device manager module utilizes the device registration data 128 to provide voice-over content with presentation and audio content automatically to a particular user's device at the beginning of an online conference, without requiring the user to request the voice-over content.

The presentation content is output by the conference manager module 110 with the audio content and/or the voice-over content, such as to the client device 106 that requested the voice-over content as part of the online conference 112. Alternatively or additionally, the conference manager module 110 can store a version of the online conference 112 that includes the voice-over content as associated with the presentation and audio content in the storage 126 for subsequent access by additional devices. The conference system 102 can make the online conference 112, including the voice-over content associated with the presentation and audio content, available to additional devices, for example additional client devices via the network 108, e.g., part of a subscription-based service.

Figure 2:
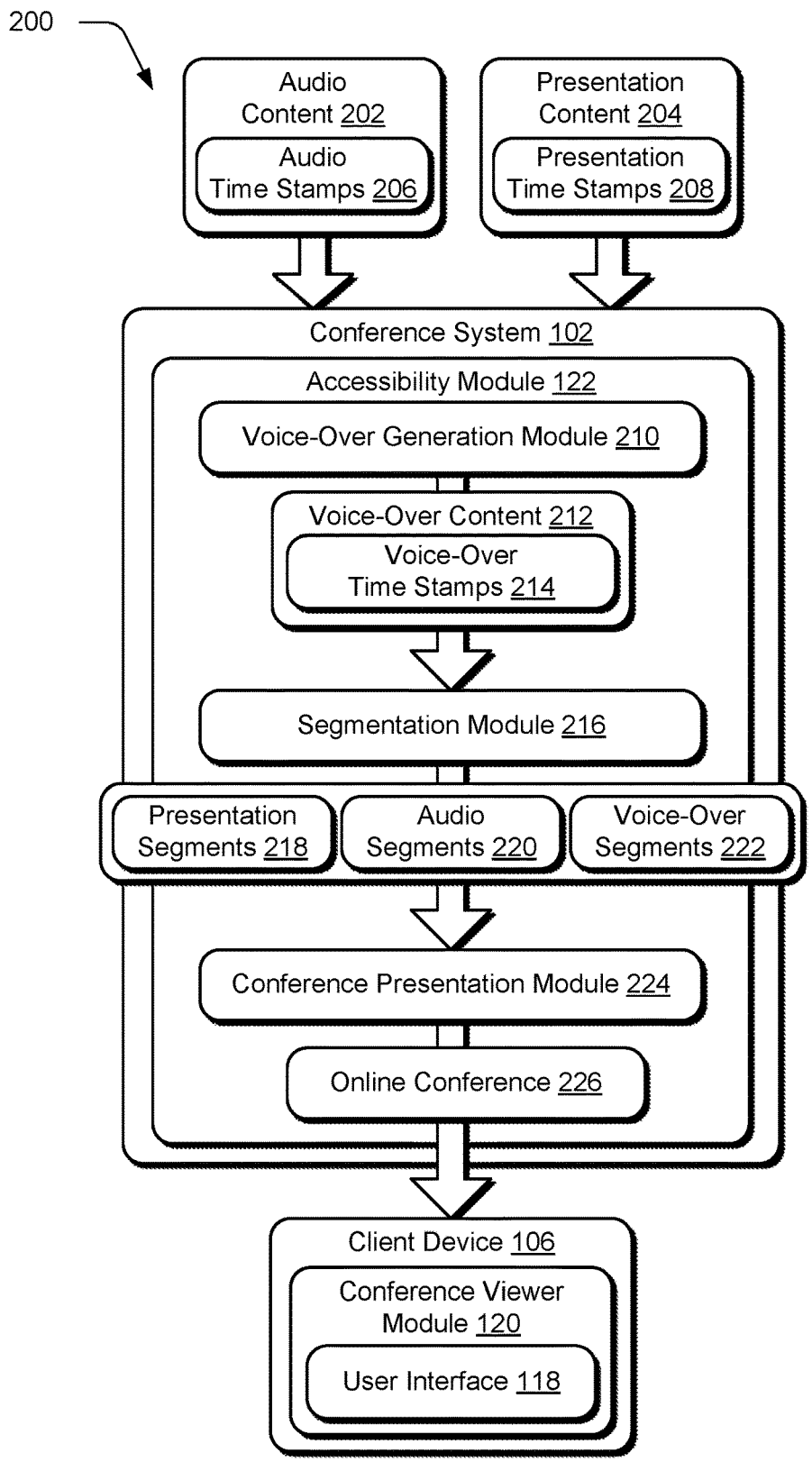
FIG. 2 depicts a system in an example implementation showing operation of an accessibility module of FIG. 1 in greater detail.

FIG. 2 depicts a system 200 in an example implementation showing operation of the accessibility module 122 of FIG. 1 in greater detail. To begin this example, the accessibility module 122 receives audio content 202 and presentation content 204, such as from the conference presenter module 116 of the client device 104 as described above. In some examples, the audio content 202 includes audio time stamps 206, which are indications of time during an audio recording that indicate where a particular component of the audio is located. The audio time stamps 206 can be inserted using markers in an audio recording, or can be placed into a written transcription of an audio recording, to name a few examples. For instance, in an audio transcription, time stamps can be inserted at regular intervals (e.g., every minute, every 30 seconds, and so on), at locations of the audio recording where speakers change, at locations of the audio recording where presentation content such as a slide changes, and so forth.

Additionally, the presentation content 204 may include presentation time stamps 208, which are indications of time during a presentation recording that indicate where a particular component of the presentation is located. The presentation time stamps 208 can be inserted using markers in a video recording, such as when a slide of a presentation changes, when a scene of the video recording changes, at regular intervals (e.g., every minute, every 30 seconds, and so on), at commercial breaks during a video recording, and so forth.

A voice-over generation module 210 receives the presentation content 204 and generates voice-over content 212 from the presentation content. The voice-over generation module 210 translates textual words in the presentation content 204 to a stream of audio using the audio library 124 of FIG. 1, and generates the voice-over content 212 using the translation. In examples, the voice-over generation module 210 generates voice-over time stamps 214 which are indications of time during a voice-over of a presentation recording that indicate where a particular component of the voice-over is located. The voice-over generation module 210 assigns the voice-over time stamps 214 to the voice-over content 212 based on events in the presentation content 204.

For example, where the presentation content 204 includes presentation time stamps 208 for each slide of a presentation, the voice-over generation module 210 determines that the time stamps at the slide transitions are an event occurring in the presentation content. The voice-over generation module 210 assigns the time stamp for each slide transition to the voice-over content 212 for the corresponding slide based on the occurrence of the event. The voice-over time stamps 214 thus relate to a time in the voice-over content 212 where an event in the presentation content 204 occurs, such as the change from one slide to another of a presentation, changing of a presenter, at a sentence or subject break, and so forth. However, the voice-over time stamps 214 are independent of the durations of the audio time stamps 206 and the presentation time stamps 208, as described in relation to the following FIG. 3.

Figure 3:
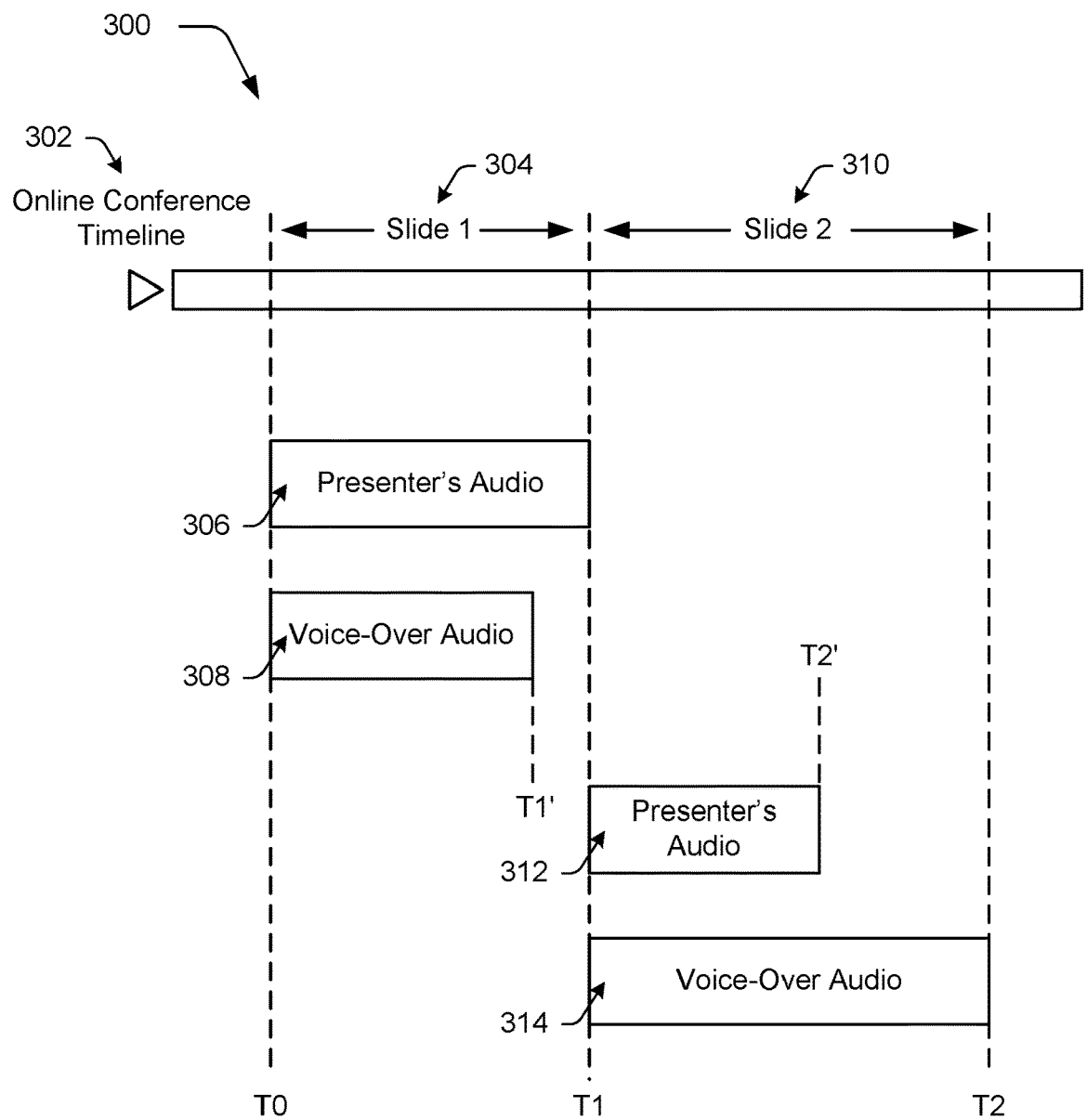
FIG. 3 depicts an example implementation showing timing differences of associated audio content of an online conference as described herein.

FIG. 3 depicts an example 300 showing timing differences of associated audio content of an online conference as described herein. An online conference timeline 302 is shown representing the progression of an online conference as part of an interactive experience between client devices as described herein. A first slide 304 of the online conference begins at time T0, and a presenter's audio 306 is captured during presentation of the first slide. The presenter's audio 306 corresponds to at least a portion of the audio content 202 of FIG. 2, and may include audio time stamps 206 as described above. For instance, audio content corresponding to the presenter's audio 306 may include a time stamp at T0, and a time stamp at a conclusion of the presentation of the first slide 304 at T1.

When presentation of the first slide 304 begins, for example, the voice-over generation module 210 begins translating text of the presentation content to audio, resulting in voice-over audio 308. The voice-over audio 308 corresponds to at least a portion of the voice-over content 212 of FIG. 2, and may include voice-over time stamps 214 as described above. In this case, the duration of the voice-over audio 308 ends at time T1', which is before the presenter's audio 306 ends at time T0. The voice-over generation module 210 includes a time stamp at time T1' with the voice-over audio 308, indicating the conclusion of the voice-over content corresponding to the first slide 304. Accordingly, the time stamp at time T1' included with the voice-over audio 308 relates to the event of the content of the first slide 304 concluding. Additionally, although occurring at a different time, the time stamp included with the presenter's audio 306 at T1 corresponds to the event of the content of the first slide 304 concluding as well.

The voice-over generation module 210 may determine that the presentation content then transfers from the first slide 304 of the presentation to a second slide 310 of the presentation at T1, such as by an indication included with the presentation content or from a client device taking part in the online conference. At time T1, the presenter's audio 312 is again captured during presentation of the second slide 310. The presenter's audio 312 also corresponds to at least a portion of the audio content 202, and similarly may include time stamps 206 as described above. The audio content corresponding to the presenter's audio 312 may include a time stamp at time T1, and at a conclusion of the presentation of the second slide 312 at T2'.

When the second slide 310 of the presentation begins at T1, the voice-over generation module 210 begins translating text of the presentation content to audio, resulting in voice-over audio 314. The voice-over audio 314 corresponds to at least a portion of the voice-over content 212 of FIG. 2, and may include voice-over time stamps 214 as described above. With respect to the second slide 310, the voice-over audio 314 is a longer duration than the presenter's audio 312, ending at time T2. Rather than transitioning beyond the second slide 310 at time T2' when the presenter's audio 312 concludes, the second slide may continue to be displayed for conference participants for the duration of the voice-over audio 314 according to techniques described herein. In any case, the time stamp included at time T2 included with the voice-over audio 314 relates to the event of the content of the second slide 310 concluding. Additionally, although occurring at a different time, the time stamp included with the presenter's audio 312 at T2' corresponds to the event of the content of the second slide 310 concluding as well.

Returning to a discussion of FIG. 2, the voice-over generation module 210 utilizes speech synthesis and/or screen reading techniques and systems to convert text of the presentation content to audio, or in some examples, to Braille. Speech synthesis systems concatenate pieces of recorded speech stored in a database, such as the audio library 124. A speech synthesis system may first convert raw text containing symbols such as numbers and abbreviations into equivalent, written-out words. Then, phonetic transcriptions are assigned to each word, and the text is divided and marked into prosodic units such as phrases, clauses, and/or sentences. Next, a synthesizer of a speech synthesis system converts the symbolic linguistic representation into sound, which may include computation of the target prosody (pitch contour, phoneme durations, and so forth), which is then imposed on the output speech. Alternatively or additionally, the voice-over generation module 210 may utilize screen reading systems such as Job Access With Speech (JAWS) and/or NonVisual Desktop Access (NVDA). JAWS and/or NVDA may be integrated as part of the voice-over generation module 210, or may be accessed remotely via the network 108 of FIG. 1, for instance.

Next, a segmentation module 216 divides the presentation content 204 into presentation segments 218. The segmentation module 216 also divides the audio content 202 into audio segments 220 that correspond to respective ones of the presentation segments 218, and divides the voice-over content 212 into voice-over segments 222 that correspond to respective ones of the presentation segments. For example, the segmentation module 216 divides the presentation content 204 into the presentation segments 218 based on the presentation time stamps 208, the audio time stamps 206, and/or the voice-over time stamps 214. Alternatively or additionally, the presentation segments 218 may range from individual words or phrases to slides of a presentation, or segments larger than slides of the presentation, to name a few examples. The presentation segments 218, audio segments 220, and the voice-over segments 222 correspond to related content of the presentation, allowing online conference participants to easily navigate to and between related portions of the presentation content 204, the audio content 202, and the voice-over content 212.

A conference presentation module 224 receives the presentation segments 218, the audio segments 220, and the voice-over segments 222, and uses these segments to conduct an online conference 226. As part of the online conference 226, the conference presentation module 224 enables switching between corresponding audio segments 220 and voice-over segments 222 during output of a respective presentation segment 218. Because the content of a corresponding presentation segment 218, audio segment 220, and voice-over segment 222 are associated with one another based on content (e.g., rather than being displayed for a set duration), conference participants can switch between the different audio content as desired without missing content from either the presenter or a voice-over of textual content, as occurred with conventional screen-reading techniques.

As part of conducting the online conference 226, the conference presentation module 224 may output the online conference to the client device 106. The client device 106 can then present the online conference 226 in the user interface 118 of the conference viewer module 120. For example, the online conference 226 includes a voice selected by the presenter of the online conference 112 for the voice-over content 212, which outputs translated text of the presentation content 204. In this way, the user of the client device 106 receives an immersive conference experience that maintains coordination between the subject matter spoken by the presenter with the subject matter of the presentation content, and can switch between the two at the user's convenience.

While the system 200 describes the accessibility module 122, including the voice-over generation module 210, the segmentation module 216, and the conference presentation module 224, being located at the conference system 102, one or more of these modules 122, 210, 216, 224 may also exist at the client device 106. For example, the voice-over generation module 210 along with the audio library 124 may be located at the client device 106 to facilitate translation of the presentation content 202 to voice-over content. Alternatively or additionally, the segmentation module 216 and/or the conference presentation module 224 may be located at the client device 106 to coordinate output of the audio content 202 with the voice-over content 212, such as to account for network latency.

Figure 4:
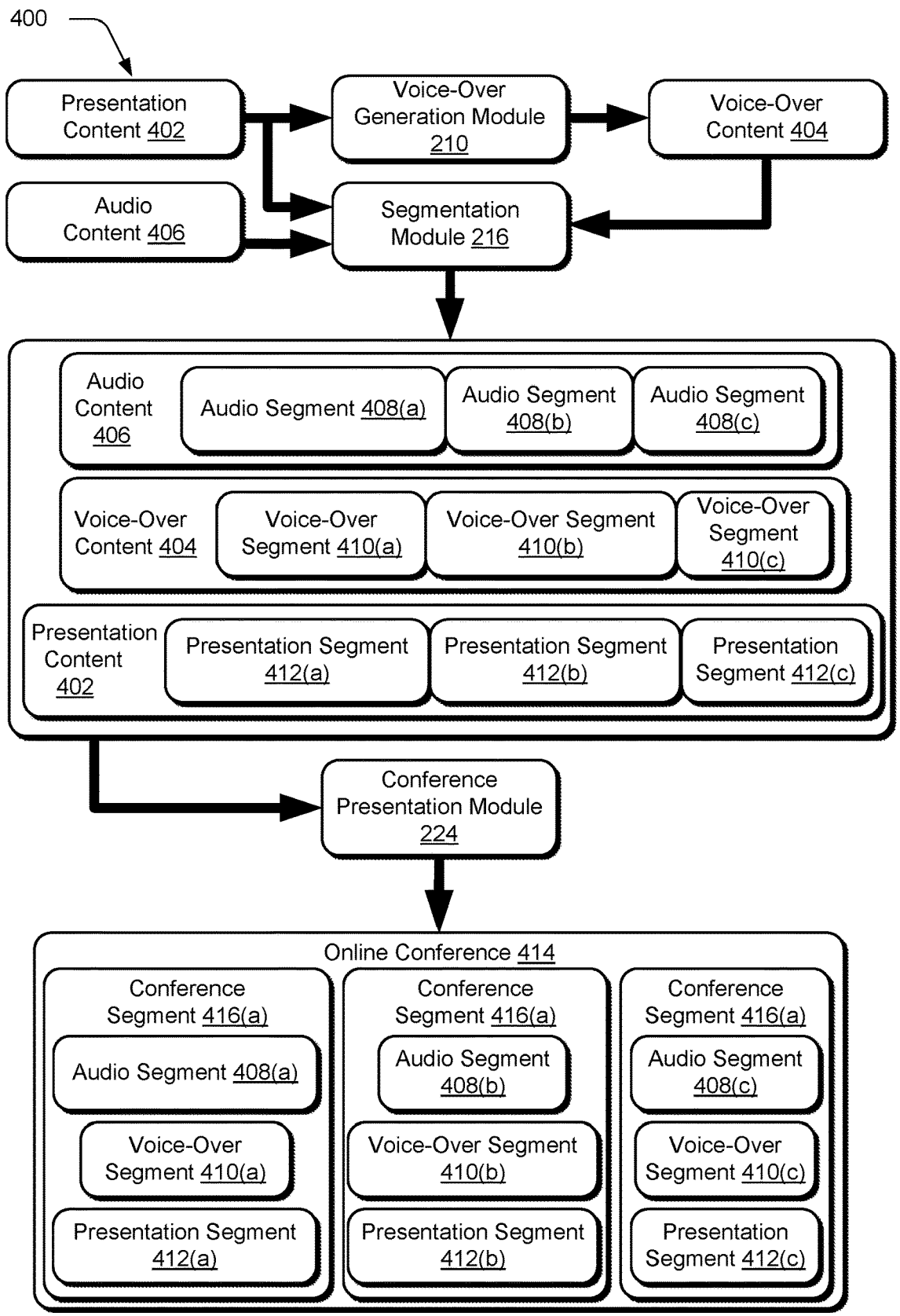
FIG. 4 depicts a system in an example implementation showing operation of a segmentation module and a conference presentation module of FIG. 2 in greater detail.

Turning now to FIG. 4, a system 400 is depicted in an example implementation showing operation of the segmentation module 216 and the conference presentation module 224 of FIG. 2 in greater detail. To begin this example, the voice-over generation module 210 receives presentation content 402 as described above, such as from the conference presenter module 116 of the client device 104 via the network 108. The voice-over generation module 210 generates voice-over content 404 from the presentation content 402, such as by using utilize speech synthesis and/or screen reading techniques and systems to convert text of the presentation content to audio, as described above.

The segmentation module 216 also receives the presentation content 402, along with the voice-over content 404 from the voice-over generation module 210 and audio content 406. The audio content 406 may be received from the conference presenter module 116 of the client device 104 via the network 108 as described above. Then, the segmentation module 216 divides the audio content 406 into audio segments 408(a)-(c). In this example, each of the audio segments 408(a)-(c) have different durations as represented by the different sizes of the segments in the example system 400. The segmentation module 216 may divide the audio segments 408(a)-(c) based on audio time stamps included in the audio content 406, based on individual words or phrases of the audio content, based on events during a presentation such as slide transitions or presenter changes, and so forth.

The segmentation module 216 also divides the voice-over content 404 into voice-over segments 410(a)-(c). In this example, each of the voice-over segments 410(a)-(c) have different durations as represented by the different sizes of the segments in the example system 400. Additionally, in this example, the voice-over segments 410(a)-(c) have different durations than the audio segments 408(a)-(c), even when a voice-over segment 410(a) corresponds to a respective audio segment 408(a) for instance.

The segmentation module 216 may divide the voice-over segments 410(a)-(c) based on voice-over time stamps included in the voice-over content 404, based on individual words or phrases of the voice-over content, based on events during a presentation such as slide transitions or presenter changes, and so forth. The segmentation module 216 may divide the voice-over segments 410(a)-(c) according to events where the audio segments 408(a)-(c) are divided, as described above, and/or divide the audio segments 408(a)-(c) according to events where the voice-over segments 410(a)-(c) are divided. In this way, the voice-over segments 410(a)-(c) correspond to the content of the audio segments 408(a)-(c), rather than the voice-over segments and/or the audio segments being a set duration.

Further, the segmentation module 216 divides the presentation content 402 into presentation segments 412(a)-(c). Each of the presentation segments 412(a)-(c) in this example have different durations as represented by the different sizes of the segments in the example system 400. The durations of the presentation segments 412(a)-(c) may correspond to the durations of the audio segments 408(a)-(c), the voice-over segments 410(a)-(c), and/or a combination of the audio segments and voice-over segments. Alternatively or additionally, the durations of the presentation segments 412(a)-(c) may be dynamic, such as when a user listens to less than an entire one of the audio segments 408(a)-(c) and/or the voice-over segments 410(a)-(c) before moving onto another audio or voice-over segment.

Accordingly, the segmentation module 216 may divide the presentation segments 412(a)-(c) based on presentation time stamps included in the presentation content 402, based on events during a presentation such as slide transitions or presenter changes, and so forth. The segmentation module 216 may divide the audio segments 408(a)-(c) and/or the voice-over segments 410(a)-(c) according to events where the presentation segments 412(a)-(c) are divided as described above. The segmentation module 216 may alternatively divide the presentation segments 412(a)-(c) according to events where the audio segments 408(a)-(c) and/or the voice-over segments 410(a)-(c) are divided. In this way, the presentation segments 412(a)-(c) each correspond to the content of a respective the audio segment 408(a)-(c) and voice-over segment 410(a)-(c), rather than the presentation segments, the voice-over segments, and/or the audio segments being a set duration.

The conference presentation module 224 receives the audio content 406, the voice-over content 404, and the presentation content 402 and outputs an online conference 414 that includes the audio content, the voice-over content, and the presentation content. The conference presentation module 224 may group respective segments of the audio content 406, the voice-over content 404, and the presentation content 402 into conference segments 408(a)-(c) as shown. For example, the conference presentation module 224 generates a conference segment 416(a) that includes the audio segment 408(a), the voice-over segment 410(a), and the presentation segment 412(a). The respective segments 408(a), 410(a), and 412(a) included in the conference segment 416(a) correspond to related content of the online conference 414. For instance, the audio segment 408(a) includes a presenter's audio during display of a slide included in the presentation segment 412(a), and the voice-over segment 410(a) includes text of the slide of the presentation segment translated into audio.

Figure 5:
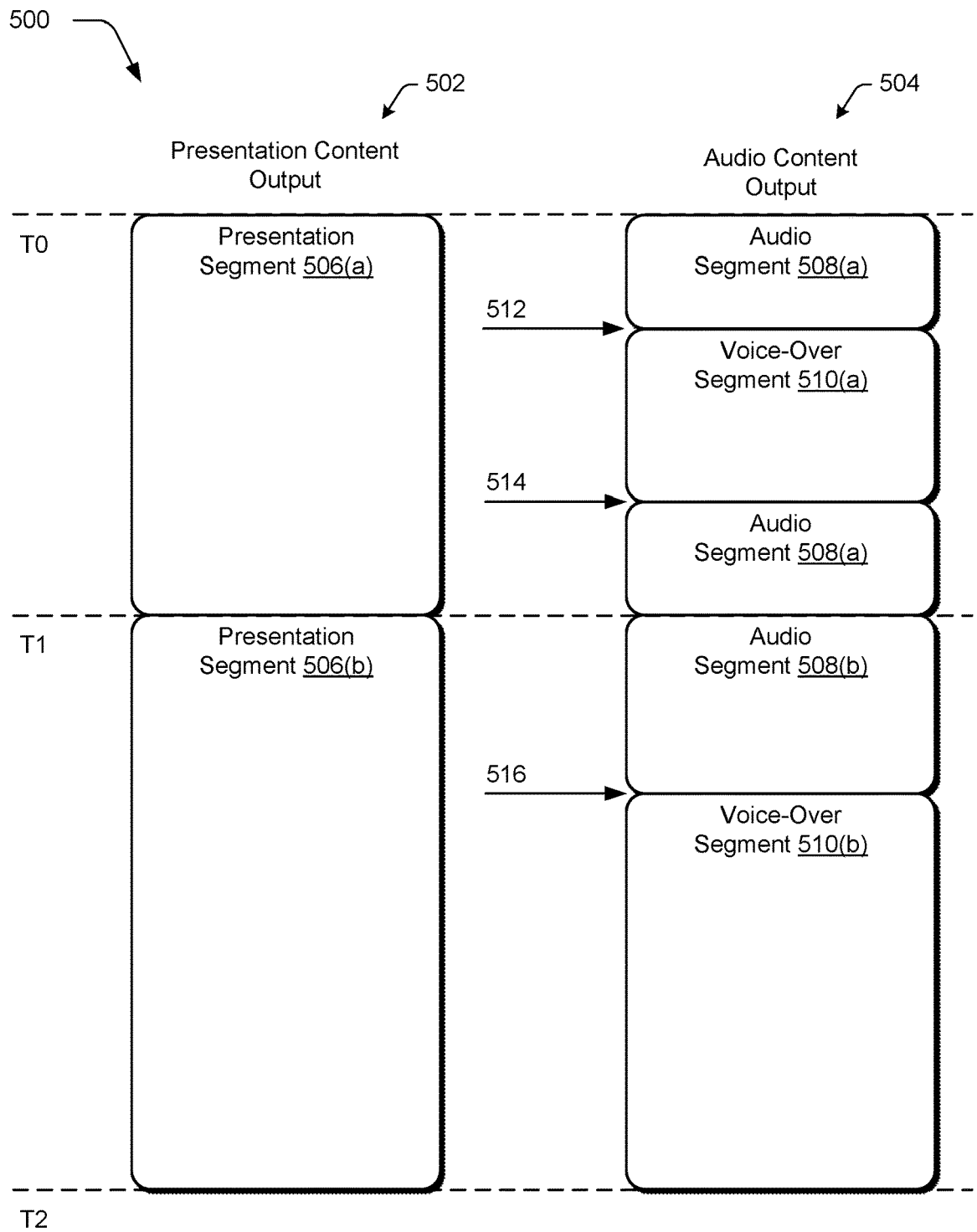
FIG. 5 depicts a system in an example implementation showing operation of accessible audio switching techniques during an online conference using the techniques described herein.

By grouping respective presentation segments, audio segments, and voice-over segments into conference segments that correspond to related content of the presentation, online conference participants can easily navigate to and between related portions of the presentation content 402, the audio content 406, and the voice-over content 404. For example, grouped conference segments allow users to fast-forward and rewind online conferences at their convenience, while keeping audio segments and voice-over segments corresponding to a presentation segment in sync. When a user fast-forwards or rewinds, the location of the content for output of the online conference is based on a conference segment, allowing for immediate switching between related audio and voice-over segments in a same conference segment. For additional understanding of how online conference navigation may be executed, consider FIG. 5, depicting an example system 500 showing operation of accessible audio switching techniques during an online conference.

To begin this example, an online conference (e.g., the online conference 414 of FIG. 4) commences at time T0.

When the online conference commences, presentation content 502 and audio content 504 are both output as part of the online conference, such as via the conference viewer module 120 of the client device 106 of FIG. 1. The presentation content 502 begins with a presentation segment 506(a), such as a slide, video, software demonstration, or other type of visual presentation content. Additionally, the audio content 504 begins with an audio segment 508(a), such as a presenter using the conference presenter module 116 of the client device 104 speaking about the content included in the presentation segment 506(a).

As the online conference progresses, the user of the client device 106 may want to switch the audio content 504 being output to a voice-over of the presentation segment 506(a). For instance, the user may want to obtain information about text in the presentation segment 506(a) if the user has a visual impairment and cannot read the text included in the presentation segment. The user may initiate an input 512 in the user interface 118 of the conference viewer module 120 indicating that the user desires to switch from the audio segment 508(a) to a voice-over segment 510(a). The voice-over segment 510(a) includes text of the slide of the presentation segment 506(a) translated into audio. Therefore, when the input 512 is received, the audio content 504 switches from outputting the audio segment 508(a) to outputting the voice-over segment 510(a).

Additionally, the conference viewer module 120, for instance, pauses the audio content 504 of the online conference and saves the location where the input 512 was received. The conference viewer module 120 may generate a time stamp or other indicator at the time of the input 512 where the audio content 504 switches from the audio segment 508(a) to the voice-over segment 510(a). The conference viewer module 120 may then begin the voice-over segment 510(a) from a beginning of the voice-over segment, so that the user may have a full understanding of the context of the presentation content as translated into the voice-over segment. Alternatively, the conference viewer module 120 may begin the voice-over segment 510(a) from a location corresponding to where the input 512 was received, such as by matching one or more words or phrases common between the audio segment 508(a) and the voice-over segment, or other events during the online conference such as displaying a bullet point of a slide, beginning a video on a slide, displaying an image on a slide, and so forth.

The online conference continues, with the presentation segment 506(a) being displayed while the voice-over segment 510(a) is output. The user of the client device 106 may want to again switch the audio content 504 being output, this time from the voice-over segment 510(a) back to the audio segment 508(a). The user may initiate an input 514 in the user interface 118 of the conference viewer module 120 indicating that the user desires to switch from the voice-over segment 510(a) to the audio segment 508(a). When the input 514 is received, the audio content 504 switches from outputting the audio segment 508(a) to outputting the voice-over segment 510(a).

The conference viewer module 120 may pause audio content 504 of the online conference and save the location where the input 514 was received, and generate a time stamp or other indicator at the time of the input 514 where the audio content switches from the voice-over segment 510(a) to the audio segment 508(a). The conference viewer module 120 may then begin the audio segment 508(a) from the location of the switch that occurred as a result of the input 512. In other words, the audio segment 508(a) resumes from the location where it was paused at the time of the input 512.

In this way, the user of the client device 106 can pick up listening to the presenter's audio that relates to the presentation segment 506(a) right where the user left off, so as to not miss information related to the particular presentation segment. Alternatively, in some examples, the audio segment 508(a) may resume at a live location of the audio content, such as in a live or collaborative presentation, for instance.

Continuing with the online conference, the audio segment 508(a) may conclude at time T1. In this example, upon conclusion of the audio segment 508(a) that is associated with the presentation segment 506(a), another presentation segment 506(b) begins, such as a new slide of the presentation content 502. Additionally, another audio segment 508(b) begins at time T1. The audio segment 508(b) may contain audio of the presenter using the conference presenter module 116 of the client device 104 speaking about the content included in the presentation segment 506(b).

The user of the client device 106 may want to switch the audio content 504 being output to a voice-over of the presentation segment 506(b) at some point during the audio segment 508(b). The user may initiate an input 516 in the user interface 118 of the conference viewer module 120 indicating that the user desires to switch from the audio segment 508(b) to a voice-over segment 510(b). The voice-over segment 510(b) includes text of the slide of the presentation segment 506(b) translated into audio. Therefore, when the input 516 is received, the audio content 504 switches from outputting the audio segment 508(b) to outputting the voice-over segment 510(b).

Additionally, the conference viewer module 120, for instance, pauses the audio content 504 of the online conference and saves the location where the input 516 was received. The conference viewer module 120 may generate a time stamp or other indicator at the time of the input 516 where the audio content 504 switches from the audio segment 508(b) to the voice-over segment 510(b). The conference viewer module 120 may then begin the voice-over segment 510(b) from a beginning of the voice-over segment, or from another appropriate location as described above.

The online conference continues, with the presentation segment 506(b) being displayed while the voice-over segment 510(b) is output. Continuing with the online conference, the voice-over segment 510(b) may conclude at time T2. Upon conclusion of the voice-over segment 510(b) that is associated with the presentation segment 506(b), another presentation segment (not pictured) may begin, such as a new slide of the presentation content 502. In this case, the conference viewer module 120 identifies that a conclusion of one at least of the two forms of audio in the audio content 504 has concluded. Therefore, the audio content 504 and the presentation content 502 can proceed to the next group of related content (or conference segment as described in relation to FIG. 4) that includes a corresponding presentation segment, audio segment, and voice-over segment.

The user interface 118 of the conference viewer module 120 may also provide an option for automatic switching between audio content and voice-over content in addition to the on-demand switching described above in relation to FIG. 5. For example, when an automatic switching mode is selected, the conference viewer module 120 may first play an audio segment corresponding to a presentation segment in a first conference segment. Then, the conference viewer module 120 may automatically switch to the voice-over segment included in the first conference segment that corresponds to the presentation segment when the audio segment concludes.

When both the audio segment and the voice-over segment corresponding to the same presentation segment have been played, the conference viewer module 120 may progress onto a second conference segment that includes a corresponding presentation segment, audio segment, and voice-over segment. The conference viewer module 120 then begins playing the audio segment from the second conference segment, and automatically switches to the voice-over segment corresponding to the presentation segment when the audio segment concludes. Alternatively, the conference viewer module 120 may play the voice-over segments from each conference segment before audio segments, or may alternate playing voice-over and audio segments from each conference segment, to name a few examples.

Although some of the techniques described above are described as being performed by conference viewer module 120, for instance, any of the above techniques may be performed by the conference manager module 110 of the conference system 102 as well. By grouping presentation segments, audio segments, and voice-over segments of an online conference based on content, users can synchronously and seamlessly switch between a presenter's audio and voice-over of text in a presentation, providing an enhanced user experience especially for users with visual impairments such as blindness.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

Figure 6:
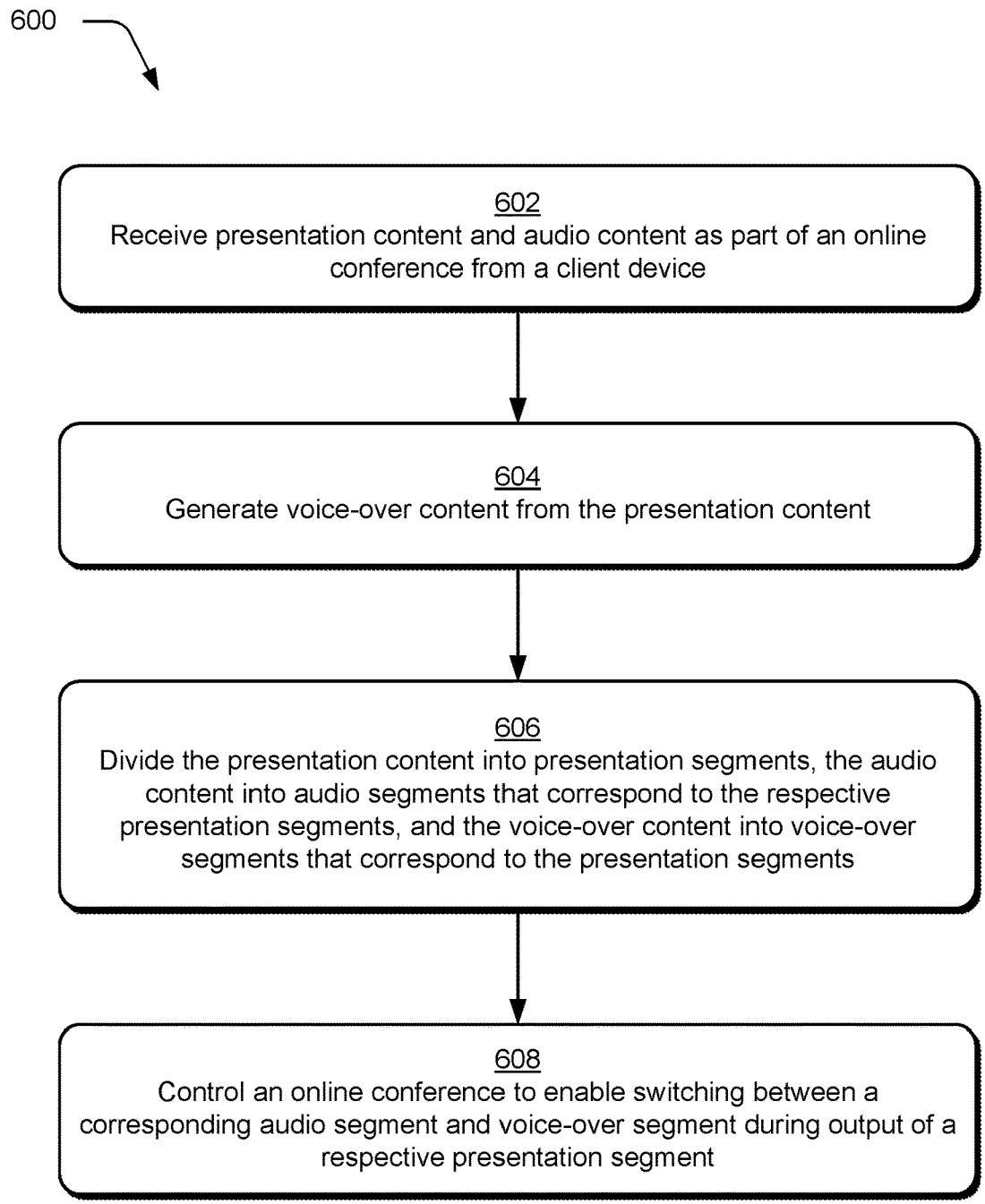
FIG. 6 is a flow diagram depicting a procedure in an example implementation in which presentation content is associated with respective segments of audio content and voice-over content of an online conference in an online conference system.

FIG. 6 depicts a procedure 600 in an example implementation in which an online conference enables switching between audio content and voice-over content associated with presentation content. First, presentation content and audio content are received as part of an online conference from a client device (block 602). The presentation content is a visual component of the online conference, such as a slide presentation, a software demonstration, a screen share, a video, and so forth. The audio content is audio which may be played concurrently with the presentation content, such as a speaker describing the presentation content, music to accompany the presentation content, and so on. The client device from which the presentation content and the audio content are received may include a conference presenter module 116 configured to manage the online conference, such as initiating the online conference, granting permissions during the online conference, terminating the online conference, and so forth. The client device may alternatively include a conference viewer module 120 configured to view the online conference and make contributions to the online conference based on designated permissions, such as contributing to a discussion, asking a question, entering a chat in a chat box, and so on.

Voice-over content is then generated from the presentation content (block 604). For instance, the accessibility module 122 may utilize speech synthesis and/or screen reading techniques and systems to convert text of the presentation content to audio, or in some examples, to Braille. To do so, the accessibility module 122 may utilize systems such as Job Access With Speech (JAWS) and/or NonVisual Desktop Access (NVDA) as part of the audio library 124 that includes audio forms of textual words and/or phrases for translation. The voice-over generation module 210 of the accessibility module 122 translates textual words in the presentation content to a stream of audio using the library, and generates the voice-over content using the translation. Consequently, the voice-over generation module 210 generates a stream of voice-over content that corresponds to the received presentation content of the online conference.

The presentation content is divided into presentation segments (block 606). Additionally, the audio content is divided into audio segments that correspond to the respective presentation segments, and the voice-over content also is divided into voice-over segments that correspond to the presentation segments. The segmentation module 216 may divide the presentation segments 218, audio segments 220, and the voice-over segments 222 in order to correspond to related content of the presentation, allowing online conference participants to easily navigate to and between related portions of the presentation content 204, the audio content 202, and the voice-over content 212. The segmentation module 216, for instance, divides the presentation content into presentation segments 412(*a*)-(*c*) which each correspond to the content of a respective the audio segment 408(*a*)-(*c*) and voice-over segment 410(*a*)-(*c*), rather than the presentation segments, the voice-over segments, and/or the audio segments being a set duration.

The online conference is then controlled to enable switching between a corresponding audio segment and voice-over segment during output of a respective presentation segment (block 608). As discussed above, because the content of a corresponding presentation segment 218, audio segment 220, and voice-over segment 222 are associated with one another based on content (e.g., rather than being displayed for a set duration), conference participants can switch between the different audio content as desired without missing content from either the presenter or a voice-over of textual content, as occurred with conventional screen-reading techniques. Switching between corresponding audio segments and voice-over segments may include on-demand switching (e.g., based on a user input), automatic switching, rejoining a live or pre-recorded online conference, rewinding, fast-forwarding, and/or a combination of the described techniques.

The availability of accessible audio switching in an online conference helps participants with physical disabilities consume online conference content in an easy and immersive way. By grouping presentation segments, audio segments, and voice-over segments of an online conference based on content, users can synchronously and seamlessly switch between a presenter's audio and voice-over of text in a presentation, providing an enhanced user experience especially for users with visual impairments such as blindness. The techniques described herein improve both consumption of online conferences for persons with physical disabilities, along with the production of online conferences for a wide range of participants, with a seamless, accessible experience for all participants.

Example System and Device

Figure 7:
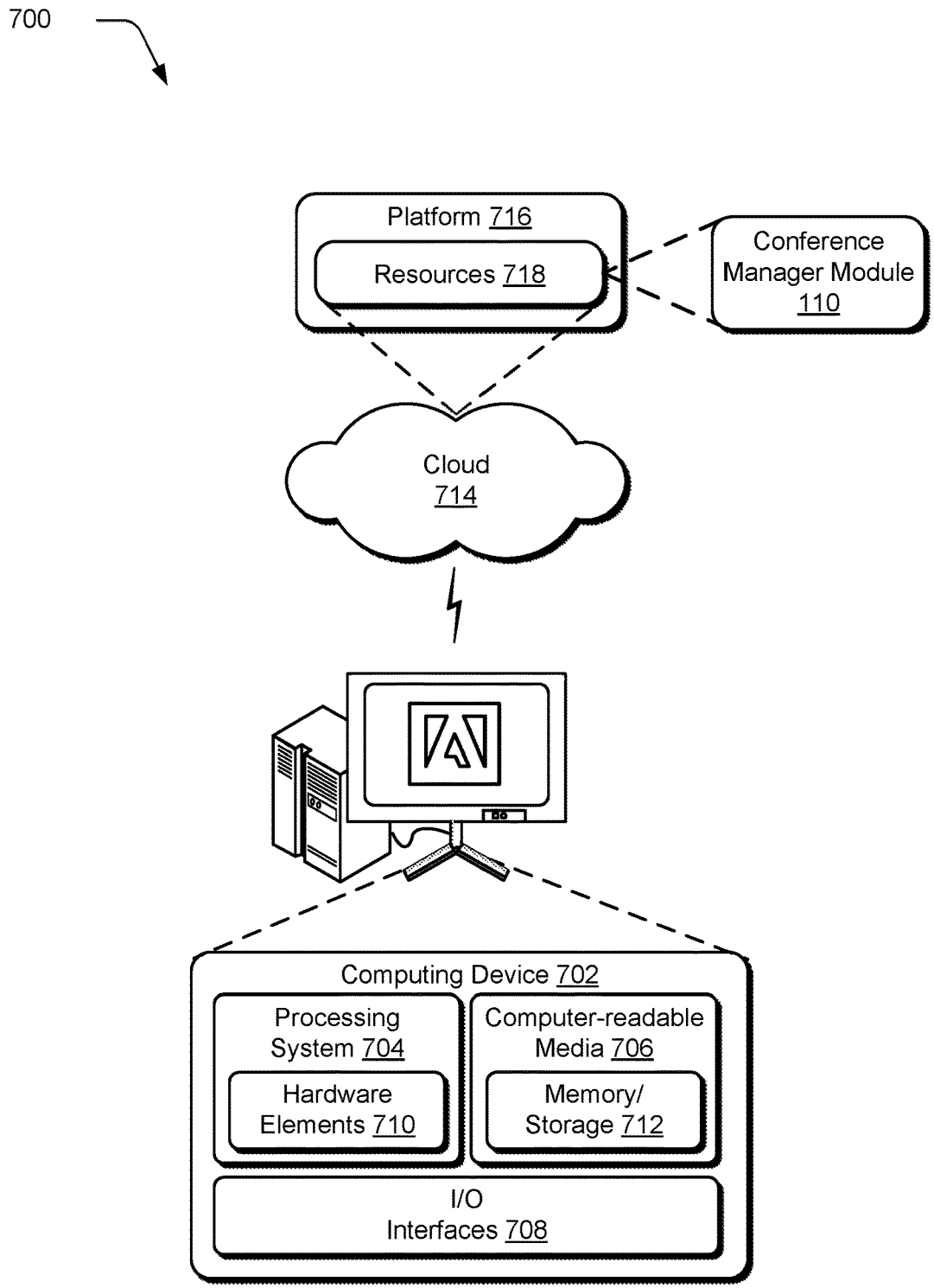
FIG. 7 illustrates an example system including various components of an example device that can be implemented as any type of computing device as described and/or utilized with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the conference manager module 110. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In an online conference within a digital medium environment, a method implemented by at least one computing device of a conference system, the method comprising:

receiving, by the at least one computing device, presentation content and audio content as part of the online conference from a client device, the presentation content including visual content, the audio content comprising an audio stream of a presenter of the online conference, wherein the audio content is generated in conjunction with output of the presentation content;

generating, by the at least one computing device, voice-over content by converting the visual content from the presentation content into audible content;

dividing, by the at least one computing device:

the presentation content into presentation segments;

the audio content into audio segments that correspond to respective ones of the presentation segments; and the voice-over content into voice-over segments that correspond to respective ones of the presentation segments; and controlling, by the at least one computing device, the online conference to enable switching between a corresponding audio segment and voice-over segment during output of a respective said presentation segment, said switching including:

pausing the audio segment at a time point during output of the respective presentation segment and in response to an instruction to output the voice-over segment;

initiating output of the voice-over segment; and resuming output of the audio segment from the time point in response to termination of output of the audio segment.

2. The method of claim 1, wherein dividing the presentation content into presentation segments comprises dividing the presentation content at an event of the online conference indicated by a time stamp included in the presentation content.

3. The method of claim 1, wherein dividing the audio content into audio segments comprises dividing the audio content at an event of the online conference indicated by a time stamp included in the audio content.

4. The method of claim 1, wherein dividing the voice-over content into voice-over segments comprises dividing the voice-over content at an event of the online conference indicated by a time stamp included in the voice-over content.

5. The method of claim 1, further comprising grouping the presentation segments, the audio segments, and the voice-over segments into conference segments based on content included in the presentation segments, the audio segments, and the voice-over segments.

6. The method of claim 1, wherein the enabling the switching between the corresponding audio segment and voice-over segment includes on-demand switching based on a user input.

7. The method of claim 1, wherein the enabling the switching between the corresponding audio segment and voice-over segment includes automatic switching between the corresponding audio segment and voice-over segment upon conclusion of the corresponding audio segment or voice-over segment.

8. The method of claim 1, wherein the enabling the switching between the corresponding audio segment and voice-over segment includes an option to switch from the corresponding voice-over segment to a live location of the corresponding audio segment.

9. In a digital medium environment for conducting an online conference, a system comprising:

a hardware-based processing system; and one or more hardware storage media storing instructions that are executable by the hardware-based processing system to implement:

a communication module stored on the one or more hardware storage media and implemented to receive presentation content and audio content as part of the online conference from a client device, the presentation content including visual content, the audio content comprising an audio stream of a presenter of the online conference, wherein the audio content is generated in conjunction with output of the presentation content;

a segmentation module stored on the one or more hardware storage media and implemented to generate voice-over content by converting visual content from the presentation content into audible content, and divide:
 the presentation content into presentation segments;
 the audio content into audio segments that correspond to the multiple presentation segments; and
 the voice-over content into voice-over segments that correspond to the multiple presentation segments; and a conference presentation module stored on the one or more hardware storage media and implemented to conduct the online conference to enable switching, in response to a user input, between an audio segment of the audio content and a voice-over segment of the voice-over content corresponding to a respective said presentation segment, said switching including to:
 pause the audio segment at a time point during output of the respective presentation segment and in response to an instruction to output the voice-over segment;
 initiate output of the voice-over segment; and
 resume output of the audio segment from the time point in response to termination of output of the audio segment.

10. The system as described in claim 9, wherein the segmentation module is further configured to divide the presentation content, the audio content, and the voice-over content at an event of the online conference indicated by time stamps included in the presentation content, the audio content, and the voice-over content.

11. The system as described in claim 9, wherein the segmentation module is further configured to group the presentation segments, the audio segments, and the voice-over segments into conference segments based on content included in the presentation segments, the audio segments, and the voice-over segments.

12. The system as described in claim 9, wherein the conference presentation module is further configured to enable automatic switching between the audio segment of the audio content and the voice-over segment of the voice-over content upon conclusion of a corresponding audio segment of the audio content or voice-over segment of the voice-over content.

13. The system as described in claim 9, wherein the conference presentation module is further configured to enable an option to switch from the voice-over segment of the voice-over content to a live location of the audio segment of the audio content.

14. The system as described in claim 9, wherein the conference presentation module is further configured to enable switching, in response to an additional user input, to a location of the audio segment of the audio content or voice-over segment of the voice-over content where the user input occurred.

15. In a digital medium environment for conducting an online conference, a system comprising:
 a hardware-based processing system; and
 one or more hardware storage media storing instructions that are executable by the hardware-based processing system to perform operations including:
  receiving presentation content and audio content as part of the online conference from a client device, the presentation content including visual content, the audio content comprising an audio stream of a presenter of the online conference, wherein the audio content is generated in conjunction with output of the presentation content;
  generating voice-over content by converting visual content from the presentation content into audio content;
  dividing:
   the presentation content into presentation segments;
   the audio content into audio segments that correspond to respective ones of the presentation segments; and
   the voice-over content into voice-over segments that correspond to respective ones of the presentation segments; and
  controlling the online conference to enable switching between a corresponding audio segment and voice-over segment during output of a respective said presentation segment, said switching including:
   causing output of the audio segment in conjunction with output of the presentation segment;
   determining that output of the audio segment is concluded; and
   initiating output of the voice-over segment in conjunction with continued output of the presentation segment in response to conclusion of the audio segment.

16. The system as described in claim 15, wherein the operations further including grouping the presentation segments, the audio segments, and the voice-over segments into conference segments based on content included in the presentation segments, the audio segments, and the voice-over segments.

17. The system as described in claim 15, wherein the operations further including enabling on-demand switching between the corresponding audio segment and voice-over segment based on a user input.

18. The system as described in claim 15, wherein the operations further including enabling automatic switching between the corresponding audio segment and voice-over segment upon conclusion of the corresponding audio segment or voice-over segment.

19. The method of claim 1, wherein generating voice-over content further comprises converting the visual content from the presentation content into braille.

20. The system as described in claim 9, wherein the segmentation module is further configured to convert the visual content from the presentation content in braille.

* * * * *